E. H. FARQUHAR.
SELF CENTERING SHAFT PACKING.
APPLICATION FILED JULY 9, 1909.
980,231.
Patented Jan. 3, 1911.
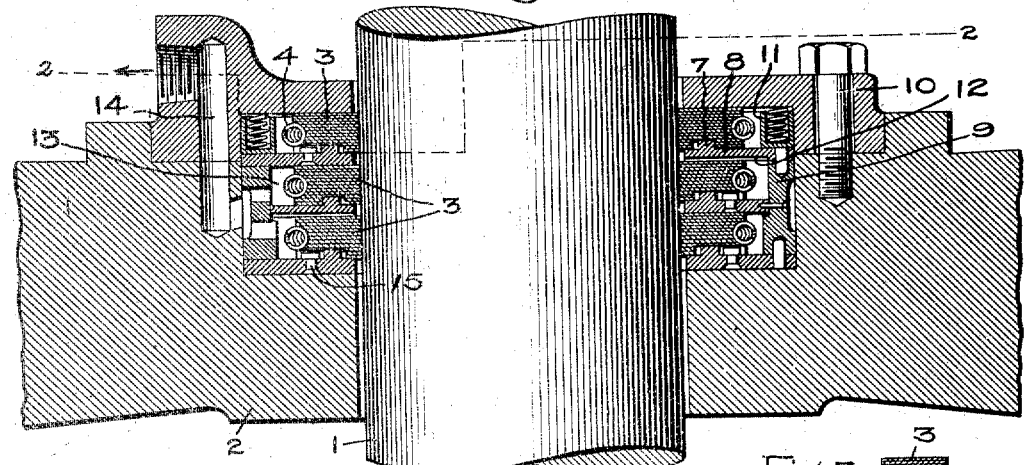
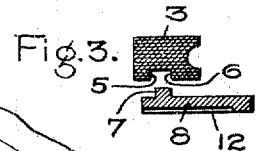
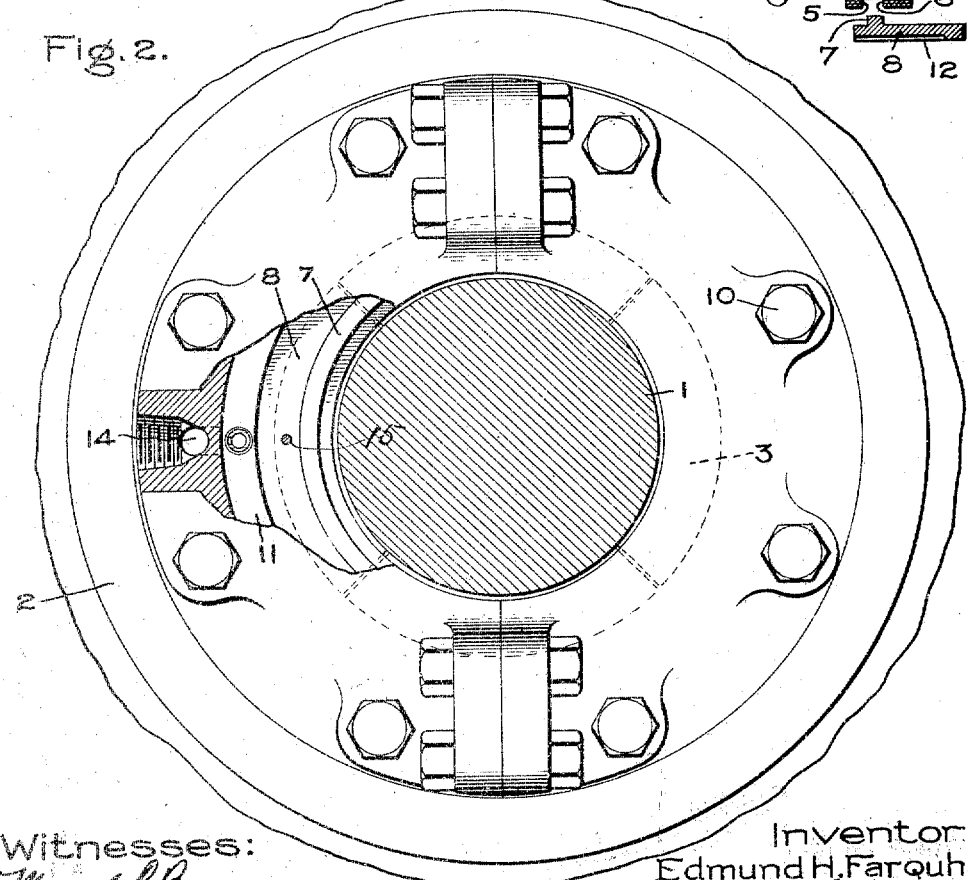
Witnesses:
Inventor:
Edmund H. Farquhar,
by Albert G. Davis
Att'y.

UNITED STATES PATENT OFFICE.

EDMUND H. FARQUHAR, OF SCHENECTADY, NEW YORK, ASSIGNOR TO GENERAL ELECTRIC COMPANY, A CORPORATION OF NEW YORK.

SELF-CENTERING SHAFT-PACKING.

980,231.  Specification of Letters Patent.  Patented Jan. 3, 1911.

Application filed July 9, 1909. Serial No. 506,738.

*To all whom it may concern:*

Be it known that I, EDMUND H. FARQUHAR, a citizen of the United States, residing at Schenectady, county of Schenectady, State of New York, have invented certain new and useful Improvements in Self-Centering Shaft-Packings, of which the following is a specification.

This invention relates to devices for packing the joint where a shaft passes through a casing containing steam or other elastic fluid under pressure.

The invention is especially applicable to steam turbines and will be hereinafter described in that connection, though capable of employment in other machines.

The object of the invention is to limit the lateral shifting of a segmental packing ring surrounding a shaft, and to this end it consists in a stop or retainer adapted to engage with a shoulder on said packing ring and confine the radial movement of its segments within a certain range.

To understand the invention better, it must be remembered that the carbon packing rings do not actually touch the shaft, but a small clearance is left to provide first for the expansion of the shaft when it heats up, and secondly to avoid friction and possible cutting of the shaft which might result from a rubbing of the packing thereon. When a turbine is running, however, there is liable to be more or less vibration of the shaft, which subjects the packing to a series of hammer blows, exerted in various directions and causing first one segment of the ring and then another to be driven radially outward. Inasmuch as the ring is acted upon by a spring device such, for example, as an encircling garter spring, the tendency is, when one segment is driven outwardly, for the other segments to close in and prevent the displaced segment from returning to its proper alinement. The ring thus gets out of shape and leaves large openings for the escape of steam. My invention prevents this trouble because the retainer limits the inward movement of the segments though permitting a restricted movement outwardly. The result is that when a segment is displaced by a blow of the shaft, the other segments are held by the retainer in a position concentric with the normal position of the shaft, so that the spring can readily return the displaced segment. In other words, the packing is self-centering.

In the accompanying drawing, Figure 1 is a longitudinal section of a portion of a shaft, casing and packing; Fig. 2 is a cross sectional plan view of the same, taken on the line 2 2, Fig. 1, and Fig. 3 shows a ring and its retaining plate separated.

The shaft 1 passes through a hole in the casing 2 with a clearance sufficient to provide for expansion and a certain amount of vibration. The casing is preferably counterbored to receive the packing rings 3, which are preferably made of carbon molded in four or more segments abutting on radial lines, but the invention is not limited to the particular form of ring or joint illustrated. Each ring is encircled by a garter spring 4, which urges the segments inwardly. The inner diameter of each ring is a few thousandths of an inch larger than the shaft, to allow for the expansion of said shaft when heated and to prevent the ring from actually touching the shaft when perfectly concentric with it. In order to retain the ring in this normal concentric position, and also to self-center it when a segment is momentarily displaced, I form in each ring a concentric groove having abrupt walls or shoulders 5, 6. This groove receives an annular rib 7 on an annular retaining plate 8 rigidly fixed in the counterbore concentric with the normal position of the shaft. If three or more packing rings are used, the lower retaining plate lies on the bottom of the counterbore and the others are secured to an annular shell 9 fitting the wall of the counterbore. The rings and plates are secured by a cap 10 bolted to the casing. A spring-pressed ring 11 may be interposed between said cap and the upper plate. The cap, plates and shell thus form a casing having chambers with the transverse walls of which the side faces of the segmental rings 3 are in sliding engagement. The studs or pins 15 engage suitable recesses in the segments and prevent their rotating with the shaft. The pins also serve to keep the joints between the segments of the several rings in proper staggered relation but do not interfere with the sliding movement of the segments.

The outer shoulder 6 on the ring abuts against the rib 7 when the ring is in its normal position, so that no segment can move inwardly from that position. Between the rib and the inner shoulder 5 is a certain amount of clearance, as shown, which permits any segment to be displaced radially outward by a side thrust of the shaft. But as the other segements cannot follow it, the spring 4 can return said segment as soon as the shaft moves back to its normal position. In this way the ring is enabled to self-center itself continually, and maintain its normal internal diameter.

In the annular plates 8, (except the lower one) are shallow radial grooves 12 which conduct the leakage steam to a chamber 13 surrounding the rings inside the shell, from which it passes by ports to a duct 14 and thence to a pipe (not shown) leading to a lower stage of the turbine.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a shaft, of a segmental self-centering packing ring therefor, the bore of the ring being slightly larger than the diameter of the shaft.

2. The combination with a shaft, of a segmental packing ring therefor, the bore of the ring being slightly larger than the diameter of the shaft, a spring encircling said ring and tending to press its segments toward the shaft, and means for self-centering said segments.

3. The combination with a shaft, of a segmental packing ring therefor, the bore of the ring being slightly larger than the diameter of the shaft, and means for returning a displaced segment to a normally concentric position with respect to said shaft.

4. The combination with a shaft, of a segmental packing ring therefor, the bore of the ring being slightly larger than the diameter of the shaft, and means for permitting any segment to be displaced outwardly from and returned to a normal concentric position without disturbing the other segments.

5. The combination with a shaft, of a segmental packing ring therefor, a spring encircling said ring, and a stationary retaining plate adapted to prevent inward radial movement of said segments beyond a normal concentric position.

6. The combination with a shaft, of a segmental packing ring therefor, the bore of the ring being slightly larger than the diameter of the shaft, a spring encircling said ring, and a stationary retaining plate permitting a limited outward movement of said segments from a normal concentric position.

7. The combination with a shaft, of a segmental packing ring therefor containing a concentric groove, and a retaining plate having a rib engaging said groove.

8. The combination with a shaft, of a segmental packing ring therefor containing a concentric groove, and a retaining plate having a rib engaging the outer wall of said groove, with a clearance between said rib and the inner wall of said groove.

9. The combination with a shaft, of a chambered casing surrounding the shaft, a segmental packing ring mounted in the chamber with its side faces in sliding engagement with the walls of said chamber, there being a circular groove in a face of the ring, spring means which tends to press the segments of the ring toward the shaft, and a rib on a wall of the chamber which coöperates with said groove to limit the movement of the segments toward the shaft but permits them to move outwardly under certain conditions.

In witness whereof, I have hereunto set my hand this 7th day of July, 1909.

EDMUND H. FARQUHAR.

Witnesses:
 BENJAMIN B. HULL,
 HELEN ORFORD.